Feb. 5, 1952     B. R. UNDERWOOD     2,584,172
ANTIFRICTION THRUST BEARING FOR ELECTRIC SOCKET WRENCHES
Filed April 1, 1947     2 SHEETS—SHEET 1

Inventor
Burl R. Underwood

By Clarence A. O'Brien
and Harvey B. Jacobson
Attorneys

Feb. 5, 1952     B. R. UNDERWOOD     2,584,172
ANTIFRICTION THRUST BEARING FOR ELECTRIC SOCKET WRENCHES
Filed April 1, 1947     2 SHEETS—SHEET 2

*Inventor*
Burl R. Underwood

By *Clarence A. O'Brien
and Harvey B. Jacobson*
*Attorneys*

Patented Feb. 5, 1952

2,584,172

UNITED STATES PATENT OFFICE 2,584,172

ANTIFRICTION THRUST BEARING FOR ELECTRIC SOCKET WRENCHES

Burl R. Underwood, Ypsilanti, Mich.

Application April 1, 1947, Serial No. 738,543

3 Claims. (Cl. 308—233)

This invention appertains to novel and useful improvements in power tools and more particularly to those which may be substituted for manual wrenches and screw drivers or the like.

An object of this invention is to provide a self-contained reversible power driven tool means for performing various mechanical operations.

Another object of this invention is to provide variable ratio gear transmission means, selectively controlled, in said tool.

Another object of this invention is to provide means for controlling the direction of rotation of the said power means, thereby controlling the direction of rotation of a tool receiving means.

An object of this invention is to provide an improved means for drivingly connecting the power means and tool receiving means.

A still further object of this invention is to provide a device for materially reducing the labor involved in certain related classes of mechanical work such as repair of vehicles, mass production of articles of manufacture, etc.

Ancillary objects and features of novelty shall become apparent to those skilled in the art, in following the description of the preferred embodiment of the present invention, illustrated in the accompanying drawings, wherein.

Referring now in detail to the illustrated preferred embodiment of the present invention, like reference characters are used throughout to indicate similar elements thereof.

Figure 1:
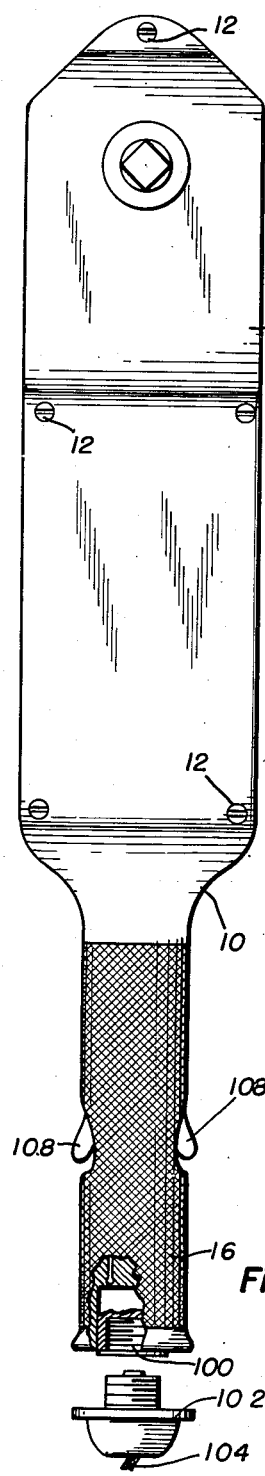
Figure 1 is an elevational side view of the preferred form of the present invention, parts being shown in section to illustrate details of construction.

This invention has been developed primarily to decrease the difficulty involved in mechanical repair and production work and to increase the speed of the mechanic or user of the invention, thereby decreasing cost of production and repair. A self-contained power-driven unit, reversible in operation, is provided for the purpose of receiving selective tools such as sockets, socket extensions and the like thereon and for driving the same. Often times it is desirable to increase the speed at which the wrench is operated and accordingly, a two-speed variable ratio gear transmission is provided herewith.

A housing 10, provided of any suitable material, preferably metallic, is provided of any suitable configuration. It may be made in halves and secured together by friction securing means such as screws 12 or the like. A reduced portion 14 is provided at one end of said housing and a knurled handle 16 is received on the other end of said housing.

A power means 18, preferably a reversible electric motor is provided in said housing 10, having a power or driven shaft 20 extending therefrom. A transverse partition 22 is provided in said housing separating the same into a motor retaining compartment and a gear box 24. A secondary housing 26 is provided in the gear box and a suitable grease retaining means or oil seal 28 is provided therebetween.

Parallel transverse walls 30 and 32 respectively extend across said housing thereby providing journalling means for various gears to be described at this time. A plurality of aligned apertures is received in said parallel walls 30 and 32, for the purpose of journalling four spur gears therein. It is noted at this point that the said spur gears 33, 34, 35 and 36 are entrained and accordingly, the end gears will rotate in the same direction upon actuation of any of said gears. Any suitable journalling means may be utilized in securing the gears 33, 34, 35 and 36 within the walls 30 and 32 respectively, the stub shafts 38 being utilized in gears 34 and 35. The end gears 33 and 36 respectively are journalled by means of relatively long shafts 40 extending therethrough.

Figures 4, 5:
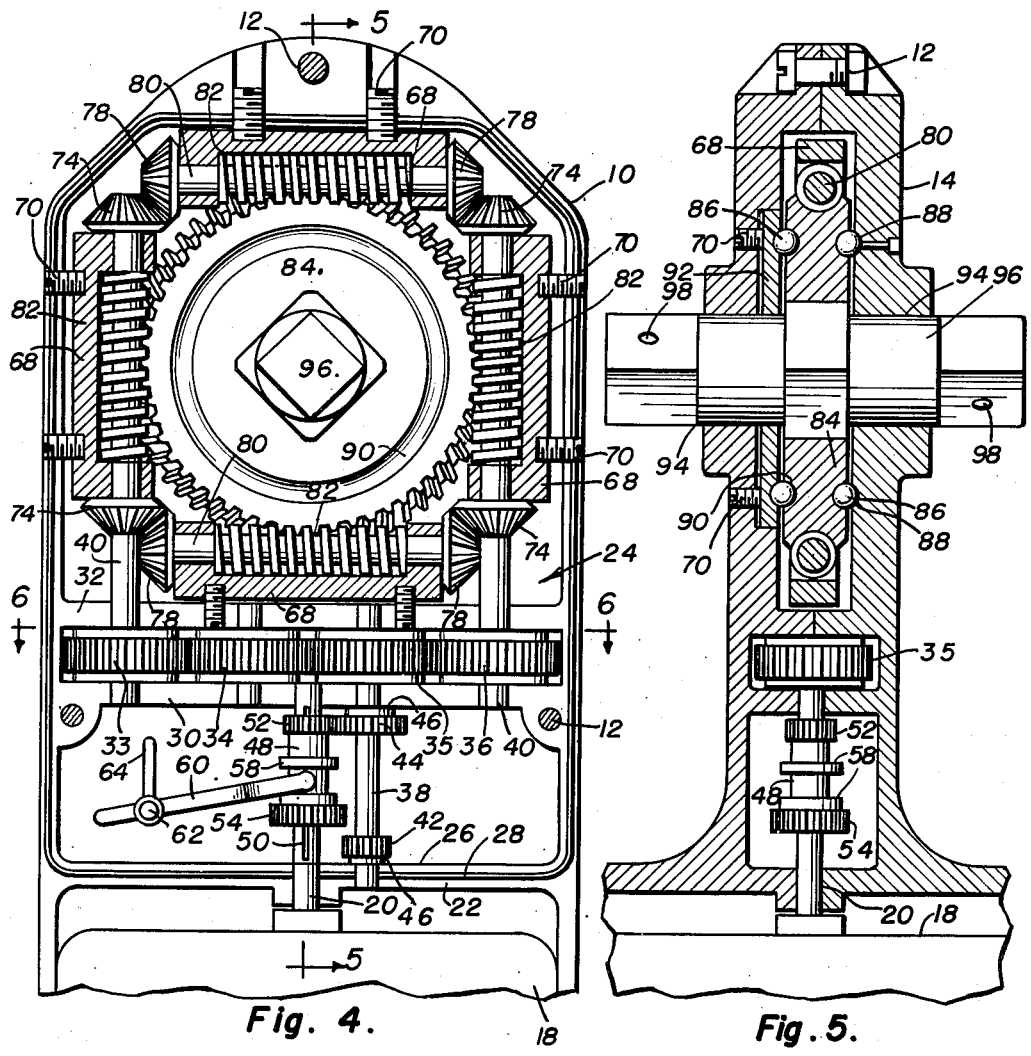
Figure 4 is a longitudinal sectional view of the invention disclosed in Figure 2 and taken substantially on the line 4—4 thereof and in the direction of the arrows.
Figure 5 is a longitudinal sectional view of the invention disclosed in Figure 4 and taken substantially on the line 5—5 thereof and in the direction of the arrows; and, Figure 6 is a transverse sectional view of a detail of construction taken substantially on the line 6—6 of Figure 4 and in the direction of the arrows.
Figure 6:
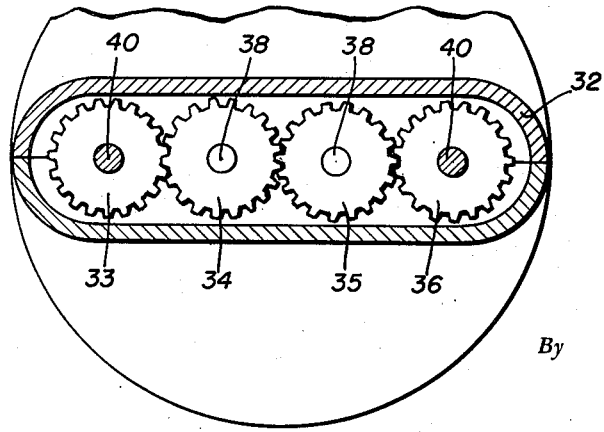

A selected stub shaft 38 extends to and within the partition 22, being journalled therein. A relatively small spur gear 42 and large spur gear 44 are provided on the selected shaft 38. Limiting means or collars 46 are rigidly secured to said shaft 38 adjacent the said gears 42 and 44. A sleeve member 48 is slidably received on splines 50, which are received on the drive shaft 20. A pair of varied size gears 52 and 54 respectively are secured to or formed integral with the sleeve member 48. It is quite apparent from an inspection of Figure 4 that by sliding the sleeve axially of the drive shaft 20, selective gears 52 and 54 are engageable with selected gears 42 and 44. By this medium, the gear ratio of the transmission formed thereby, may be varied. A pair of collars 58 are interposed between the gears 52 and 54 and a bifurcated arm 60 is engaged therebetween. The said bifurcated arm 60 is pivoted within the housing 10 by some suitable pivot pin 62. It may be seen from an inspection of Figure 2 that the pivot pin 62 extends through the housing 10 and suitable handles 64 are provided at each end thereof.

Four bearing blocks 68 are removably secured within the chamber 24, assuming the general configuration of a square. Conventional securing means such as head screws or countersunk screws 70 may be employed in rigidly fixing the bearing blocks 68 within the said chamber 24. The shafts 40 extend through a pair of said bearing blocks 68 and bevel gears 74 are provided at the terminal portions of said shafts 40. Immediately beneath each bearing block 68, there is another bevel gear 76, engageable with bevel gears 78. The last-mentioned bevel gears 78 are provided on cross shafts 80, journalled in transverse bearing blocks 68. It is deemed, from an inspection of Figure 4, that the cross shafts and drivingly connected with the relatively long shafts 40 and worms 82 are provided on each of the said shafts 40 and 80, intermediate the bevel gears thereon. A spur gear 84 is positioned between said worms and is entrained therewith. Anti-friction bearings 86 are provided in suitable grooves 88 in the housing 10 and in similar grooves 90 in the said spur gear 84. For ease in manufacture, an annular collar 92 is provided as the recipient of the anti-friction bearings 86 on a selected side of the gear 84. This annular member may be secured by conventional friction means such as the screws 70. Aligned apertures affording bearings 94 are provided in the said reduced portion of the housing 14 and a lug 96 is received therethrough. The said lug 96 is fixedly secured to the spur gear 84, while the terminal portions of said lug may be square in cross-section for receiving sockets or socket extensions thereon. The usual spring pins 98 are provided in said terminal portions for engagement with said sockets. This latter construction (the spring loaded pins) is conventional in the art and a further description thereof is deemed unnecessary.

The terminal portion of the handle member 16 is provided with internal threads 100 for receiving a conventional screw plug 102 therein. This screw plug has a conductor 104 extending therethrough for the purpose of carrying a supply of current to the electric motor 18. Conductors 106 extend to the conventional spring-loaded switches 108, thence to the poles 110 of the motor 18. The mutual ground connection conductor 112 extends between a ground pole 114 on said motor 18 and the plug inlet member 100. Upon actuation of the switches 108 selectively, the ground contacts 116 are selectively engaged along with the circuit breaking and making contacts 118.

Figure 2:
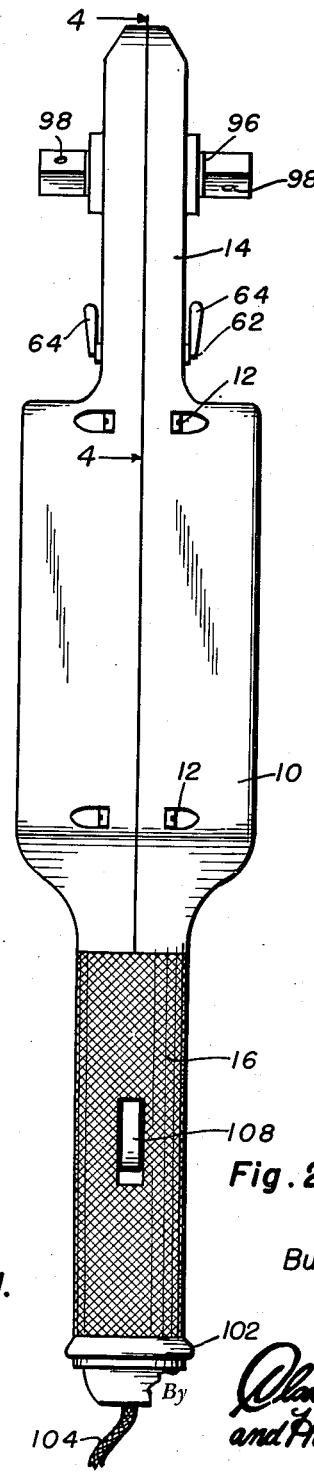
Figure 2 is an elevational side view of the invention disclosed in Figure 1.
Figure 3:
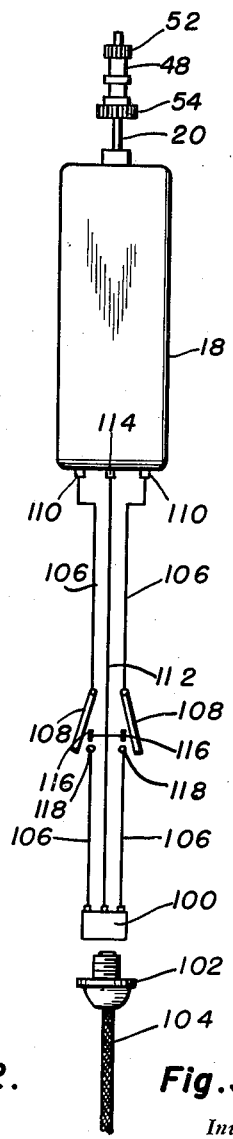
Figure 3 is a schematic wire diagram showing the electrical circuit used herewith.

It is noted from an inspection of Figure 2 that the lug 96 will be rotated upon actuation of the invention. Further, if it is desired to manufacture the invention at a reduced cost, characterized by electrical simplicity, the reversible motor 18 may be substituted by a motor capable of actuation in one direction. Selective direction of rotation of the lugs 96 may still be afforded by simply turning the invention over which, in effect, renders clockwise and counterclockwise movement available. By this construction, the ground wire 112 along with the ground contacts 116 may be obviated. This latter embodiment of the present invention discloses the same structure essentially, as described hereinabove, obviating only a small portion of the electrical circuit. Of course, when the single direction motor is utilized in lieu of reversible motor 18, one of the conductors 106 may be employed as a ground wire.

There has been described and illustrated but preferred embodiments of the present invention, capable of performing all of the specifically mentioned objects, as well as others. However, it is apparent to those skilled in the art, that various changes including omissions, additions and rearrangement of elements may be made herein without departing from the spirit of the invention. Accordingly, limitation is sought only in accordance with the scope of the following claims.

Having thus described the present invention what is claimed as novel and improved is as follows:

1. For use with a power tool, means for rotatively supporting a socket lug comprising a pair of housing sections one of which being provided with a recess, a plate having a groove disposed in said recess, a lug supporting gear disposed between said housing sections, a groove in said gear opposite said first mentioned groove, rolling means disposed in both of said grooves, and means carried by one of said sections for adjusting selectively the distance between said plate and said gear.

2. For use with a power tool, means for rotatively supporting a socket receiving lug comprising a housing having an opening therein, and a recess communicating with said opening, bearings in said housing, a socket receiving lug rotatively disposed in said bearings and extending through said recess and said opening, a gear fixed to said lug and adapted to be rotatively actuated for imparting rotative movement to said lug, a groove in said gear, a plate disposed in said recess, rolling means disposed in said groove and spacing said plate from said gear, and threaded members in said housing engaging said plate for urging said plate to selective positions with respect to said gear.

3. For use with a power tool, means for rotatively supporting a socket receiving lug comprising a housing having an opening therein, and a recess communicating with said opening, bearings in said housing, a socket receiving lug rotatively disposed in said bearings and extending through said recess and said opening, a gear fixed to said lug and adapted to be rotatively actuated for imparting rotative movement to said lug, a groove in said gear, a plate disposed in said recess, rolling means disposed in said groove and spacing said plate from said gear, and threaded members in said housing engaging said plate for urging said plate to selective positions with respect to said gear, and a passage in said housing for receiving lubricant in the opening.

BURL R. UNDERWOOD.

REFERENCES CITED

The following references are of record in the file of this patent:

UNITED STATES PATENTS

| Number | Name | Date |
| --- | --- | --- |
| 989,626 | McKinzie | Apr. 18, 1911 |
| 1,299,591 | Malchow | Apr. 8, 1919 |
| 1,384,811 | Strand | July 19, 1921 |
| 1,397,317 | Eckart | Nov. 15, 1921 |
| 1,462,938 | Knapp | July 24, 1923 |
| 1,581,927 | Kollock | Apr. 20, 1926 |
| 1,734,406 | Strand | Nov. 5, 1929 |
| 1,832,312 | Lutz | Nov. 17, 1931 |